United States Patent
Facci et al.

(10) Patent No.: US 10,005,227 B2
(45) Date of Patent: Jun. 26, 2018

(54) ELECTROSTATIC 3-D PRINTER USING ADDRESSABLE UV CROSSLINKING

(71) Applicant: Xerox Corporation, Norwalk, CT (US)

(72) Inventors: John S. Facci, Webster, NY (US); David C. Craig, Pittsford, NY (US); Varun Sambhy, Pittsford, NY (US); Eliud Robles Flores, Rochester, NY (US); David S. Derleth, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 127 days.

(21) Appl. No.: 15/152,651

(22) Filed: May 12, 2016

(65) Prior Publication Data

US 2017/0326795 A1  Nov. 16, 2017

(51) Int. Cl.
  *B29C 64/245* (2017.01)
  *B29C 64/264* (2017.01)
  *B29C 35/08* (2006.01)
  *G03G 15/16* (2006.01)
  *G03G 15/22* (2006.01)
  *G03G 15/24* (2006.01)
  *B29C 64/141* (2017.01)
  *B29C 64/40* (2017.01)
  (Continued)

(52) U.S. Cl.
  CPC ........ *B29C 64/245* (2017.08); *B29C 35/0805* (2013.01); *B29C 64/141* (2017.08); *B29C 64/223* (2017.08); *B29C 64/264* (2017.08); *B29C 64/40* (2017.08); *G03G 15/1605* (2013.01); *G03G 15/225* (2013.01); *G03G 15/24* (2013.01); *B29C 2035/0827* (2013.01); *B33Y 30/00* (2014.12); *G03G 2215/1695* (2013.01)

(58) Field of Classification Search
  CPC ......... B33Y 10/00; B33Y 30/00; B29C 64/20; B29C 64/264; B29C 64/268; B29C 64/106; B29C 64/118; B29C 64/141; B29C 64/147; B29C 64/153; B29C 67/0051; B22F 3/008; B29K 2105/251; G03G 15/14; G03G 15/224
  USPC ....................... 425/174.4, 375; 399/320, 336
  See application file for complete search history.

(56) References Cited

U.S. PATENT DOCUMENTS 7,184,698 B2  2/2007  Tombs
7,250,238 B2  7/2007  Fromm et al.
(Continued)

*Primary Examiner* — Seyed Masoud Malekzadeh
*Assistant Examiner* — Lawrence D. Hohenbrink, Jr.
(74) *Attorney, Agent, or Firm* — Gibb & Riley, LLC

(57) ABSTRACT

A 3-D printer includes a development station positioned to electrostatically transfer layers of material to an intermediate transfer surface, and a transfuse station adjacent the intermediate transfer surface. The transfuse station is positioned to receive the layers as the intermediate transfer surface moves past the transfuse station. Also, a platen is included that moves relative to the intermediate transfer surface. The intermediate transfer surface transfers a layer of the material to the platen each time the platen contacts one of the layers on the intermediate transfer surface at the transfuse station to successively form a freestanding stack of the layers on the platen. A curing station is positioned to apply ultraviolet light to each layer, after each layer is transferred from the transfuse station to the platen. The curing station selectively applies the ultraviolet light to crosslink polymers only in a portion of the material within the layer.

20 Claims, 22 Drawing Sheets

(51) Int. Cl.
*B29C 64/223* (2017.01)
*B33Y 30/00* (2015.01)

(56) References Cited

U.S. PATENT DOCUMENTS

| | | |
|---|---|---|
| 7,270,408 B2 | 9/2007 | Odell et al. |
| 7,690,782 B2 | 4/2010 | Odell |
| 7,851,549 B2 | 12/2010 | Sacripante et al. |
| 8,459,280 B2 * | 6/2013 | Swanson ................ B08B 3/104 134/117 |
| 8,470,231 B1 | 6/2013 | Dikovsky et al. |
| 8,488,994 B2 | 7/2013 | Hanson et al. |
| 9,029,058 B2 | 5/2015 | Martin |
| 9,193,110 B2 | 11/2015 | Pridoehl et al. |
| 2005/0207807 A1 | 9/2005 | Tombs |
| 2011/0020030 A1 * | 1/2011 | Mera .................... G03G 9/0812 399/111 |
| 2013/0186558 A1 * | 7/2013 | Comb ................ B29C 67/0051 156/277 |
| 2014/0134334 A1 | 5/2014 | Pridoehl et al. |
| 2014/0265034 A1 | 9/2014 | Dudley |
| 2015/0024169 A1 * | 1/2015 | Martin ................ B29C 67/0092 428/172 |
| 2015/0137426 A1 | 5/2015 | Van Esbroeck et al. |
| 2015/0142159 A1 | 5/2015 | Chang |
| 2015/0145174 A1 | 5/2015 | Comb |
| 2016/0288419 A1 * | 10/2016 | Ohnishi ............. B29C 67/0081 |

* cited by examiner

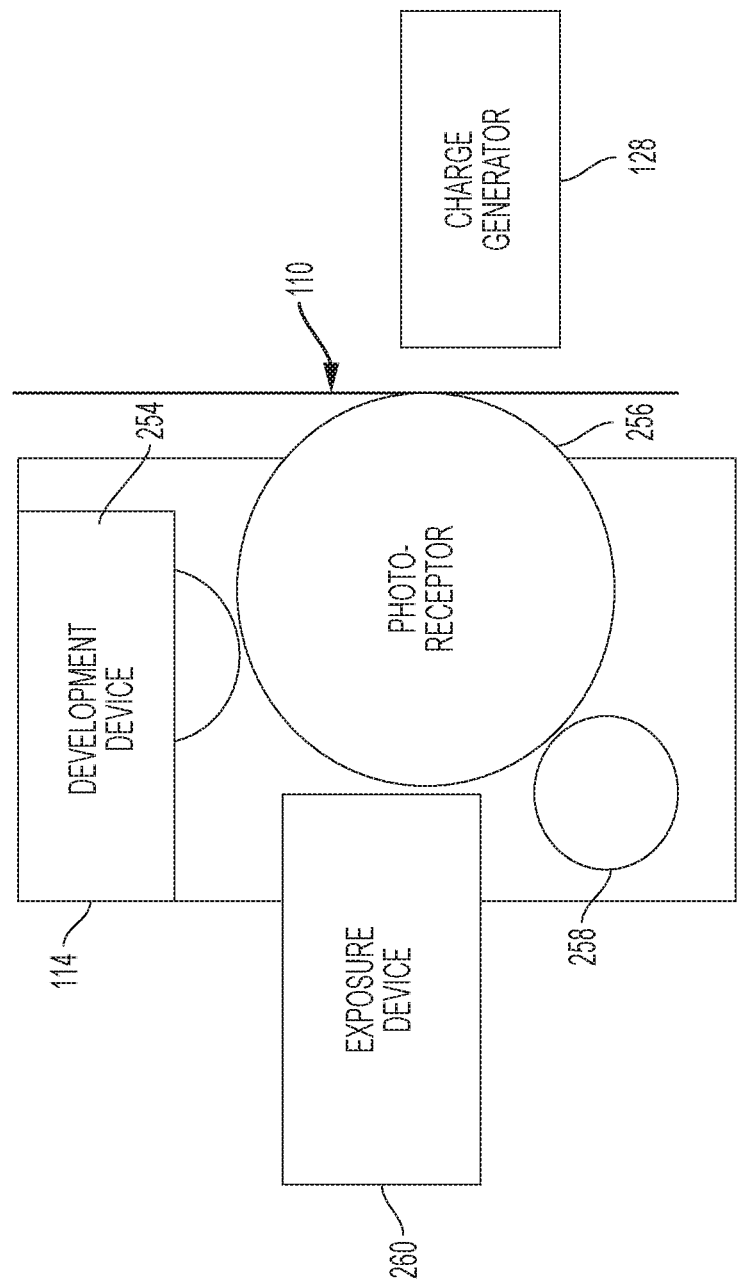

ELECTROSTATIC 3-D PRINTER USING ADDRESSABLE UV CROSSLINKING

BACKGROUND

Systems and methods herein generally relate to three-dimensional (3-D) printing processes that use electrostatic printing processes.

In general 3-D parts are built from a digital representation of the part that is divided into multiple horizontal slices. Instructions for printing individual layers are sent by a controller to the print process to form any given layer. Three-dimensional printing can produce objects using, for example, ink-jet printers.

In one exemplary three-stage process, an ink jet device selectively deposits support and build material in a layer on a platen, and each layer is hardened using a UV ultraviolet light source to crosslink the polymers of the material. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, an intermediate transfer surface, development stations positioned to electrostatically transfer different materials to the intermediate transfer surface, and a transfuse station adjacent the intermediate transfer surface. The transfuse station is positioned to receive layers of the different materials as the intermediate transfer surface moves past the transfuse station. The fusing station is positioned between the transfuse station and the curing station. The transfuse station, the fusing station, and the curing station are positioned relative to the platen, such that the platen first passes the transfuse station, then passes the fusing station, and then passes the curing station.

Such structures also include a platen moving relative to the intermediate transfer surface. The intermediate transfer surface transfers a layer of the different materials to the platen each time the platen contacts one of the layers on the intermediate transfer surface at the transfuse station to successively form a freestanding stack of the layers on the platen. After being transfused to the platen or to the top of the existing freestanding stack on the platen, a fusing station applies heat and pressure to fuse the layers on the platen together.

Additionally, a light emitting diode (LED) curing station is positioned to selectively apply LED ultraviolet light to different portions of each layer immediately after the layer is fused at the fusing station. The LED curing station selectively applies the LED ultraviolet light to the layer to crosslink polymers together in portions of the layer that are to be the build material. However, the LED curing station does not apply the LED ultraviolet light to a second portion of the layer that is to be the support material. Thus, the LED ultraviolet light crosslinks polymers in the portions of build material together, without crosslinking polymers in the support material to leave the support material as an uncrosslinked material. The portions of build material to which LED ultraviolet light is applied are less than all of the layer (thus, and these portions of build material and the support material are different portions within the layer).

The 3-D printer can also optionally include a material removal station positioned to remove the support material of the different materials within the layer to separate the portions of build material of the different materials from the support material of the different materials and leave a 3-D printed part. For example, the material removal station can include a solvent rinsing device, etc.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 22 is an expanded schematic diagram illustrating a development device herein.

DETAILED DESCRIPTION

As mentioned above, electrostatic printing process are well-known processes for generating two-dimensional (2-D) digital images, and the methods and devices herein use such processing for the production of 3-D items (for 3-D printing). However, with 3-D printing that uses electrostatic processes, the mechanical integrity of the printed material may be compromised if it is very thin, and the transfer process can impose stripping shear forces that damage the material.

In order to improve 3-D printing, this disclosure combines electrostatic printing with addressable LED curing. This involves using an electrostatic system to create layers of materials such as thermoplastics, ceramics, etc., and uses LEDs to cure the layers in order to create a 3-D part. The devices and methods herein take advantage of the fast image and material management process of electrostatic printing, and utilize a LED to crosslink polymers in the materials. 3-D processes are predicated on layer-by-layer transfuse of the build and support material, and the materials desirably have similar melt rheological properties and hence similar chemical structures; however, using materials having similar melt rheological properties makes separation by dissolution a difficult task.

Many 3-D printing processes provide for co-deposition of different build and support materials, where the support material fills in the voids in the build materials in order to mechanically support the 3-D part being printed. One aspect of selection of support material in 3-D printers that use an intermediate transfer belt (ITB) is that the support material should have nearly the same melt rheology as the build material.

Figure 1:
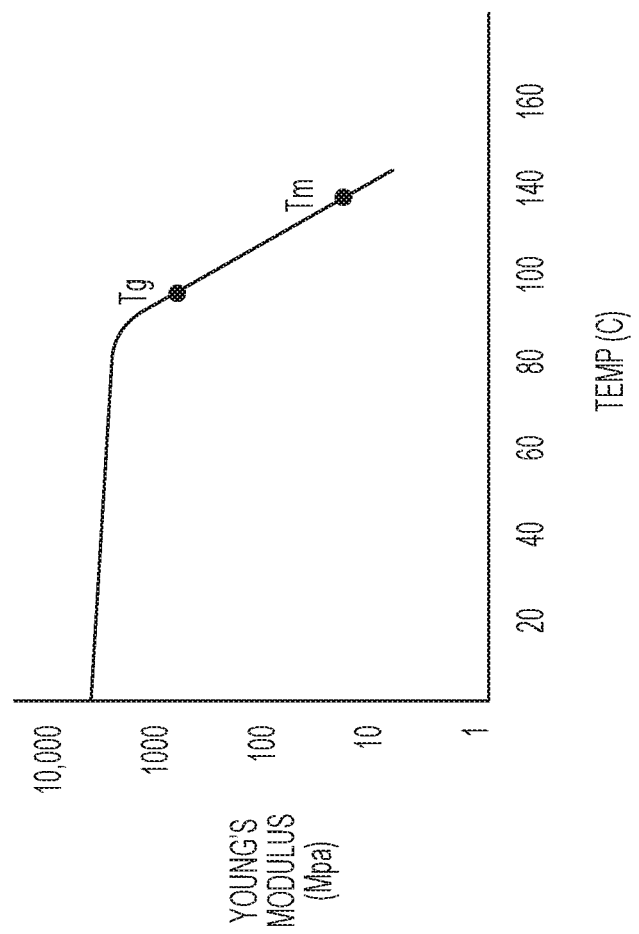
FIG. 1 is a chart showing a melt rheology curve.

The melt rheology requirements can be understood by considering the idealized melt rheology curve for a hypothetical toner resin as shown in FIG. 1. In the initial heating of the developed layer on the ITB as well as the heating of the already formed layers on the platen to the tacky state, the toner resin should be heated slightly above the glass transition temperature (Tg) but should remain well below the melting temperature (Tm) so that the integrity of the layers on the platen is maintained during transfuse, and the integrity of the transferring layer is also maintained. During the post transfer fusing step a temperature closer to Tm should be imparted to the layers to fuse the uppermost layer to the layers below. So given a particular pre-transfuse temperature, it is desirable that both the support and build material be in a similar state of tackiness and that the melt points for both be similar as well.

This implies that the melt rheology curves for both build and support material should be rather similar, otherwise there may be a loss of latitude in the temperature set points and poor transfuse of one material or the other. This sets up strict limitations in the selection of support and build material, and therefore additional work is performed to tune the resin chemical structures (e.g. molecular weight, nature of functional groups) to achieve similar melt rheology curves for the two materials.

In order to address such issues, the systems and methods here use the same material for both the support and build portions of the 3-D structure being printed; however, only the build portions are exposed to UV light and, therefore, only the polymers of the build portions are crosslinked, and the non-exposed portions (support portions) are not crosslinked. This allows the build portions to be rinsed from the support portions after printing is completed, to leave only the build portions as the completed 3-D printed part.

Thus, one general approach to separating the support from the build material is by taking advantage of differences in solubility of the two materials. It is desirable to make the support material soluble in a solvent which will not dissolve the build material. Generally speaking the latter condition is at odds with the requirement that the melt rheologies be similar. Similar melt rheologies implies similar chemical structures (molecular weight, functional groups) while the solubility disparity implies different chemical structures (different molecular weights and functional groups). Again, the systems and methods described herein reconcile differing requirements for the build and support material, while improving the mechanical properties (strength, impact resistance, etc.) of the support material made from current toners and resins by using the same material for both the support and build portions of the 3-D structure being printed; however, only the build portions are exposed to UV light and, therefore, only the polymers of the build portions are crosslinked.

Because of such issues, with methods and devices herein both the build and support materials start as a single, uniform UV radiation curable toner material. A UV LED image bar is used to image-wise expose the deposited toner after transfusing to the previously formed stack. The image-wise crosslinked toner thus becomes the build material. Rather than developing the build material pattern by having a development device transfer build material in a specific pattern to the ITB, with methods and devices herein the build pattern is created by selectively illuminating only portions of the uniform layer during post-process UV LED curing. Therefore, the unexposed areas of the uniform layer correspond to the support material. This avoids having the user find two materials that are mutually compatible with tacky transfer at the transfuse station, and provides substantial savings in both effort and cost. Additionally, using an LED to perform the UV exposure provides substantial cost and packaging benefits because LEDs are not only very power efficient, they are generally relatively inexpensive, and relatively small when compared to larger, more expensive devices such as lasers, etc.

More specifically, the developed layer and ITB are locally heated to bring the developed layer to a "tacky" state prior to transfuse (i.e., to a temperature higher than the glass transition temperature (Tg) but short of the melt or fuse temperature Tm of the toner resin). A heated platen (heated to approximately the same temperature) is then contacted synchronously with the tacky layer as it translates through the ITB-platen nip. Thus, rather than being transferred electrostatically (based on toner/belt charge differences), it is the tacky nature of the developed layer and heated platen (or previously transferred developed layers) that causes the developed layer to transfer to the platen (or previously transferred developed layers). The platen is heated to keep the toner in a tacky state as it contacts the heated toner/ITB interface, and doing so allows the toner layer to separate from the ITB and transfer under pressure to the platen surface which may contain previously deposited layers. Wax (which is present in many toners) can be included in the build/support material formulation to assist the tacky toner layer in departing from the ITB. Thus a waxy toner can be used to help parting the developed/heated layer from the ITB. Alternatively an ITB with a "Teflon-like" coating can be employed.

Following transfuse to the platen, additional heat is applied to the built up layers on the platen to fuse the top layer to those beneath it. The temperature at this step should be nearer to the melting temperature of the toner resin. At this temperature there is sufficient mobility of the individual polymer backbone chains to physically approach each other. While the toner resin is in this more liquid like state, UV radiation is selectively applied to the portions of the layer where the part being built up is located. Because only those areas which are UV exposed will be crosslinked, these areas will correspond to the build material, leaving the unexposed uncrosslinked areas functioning as the support material.

Following this, the part material is cooled to nearer the Tg and the platen is returned to its home position ready to add an additional layer. Repetition of this process allows the build of thicker layers from which a part may be fabricated.

An additional consideration with UV illumination is that any support layers beneath the UV exposed build layers should not be inadvertently exposed and crosslinked. This can be controlled by judicious selection of the nature and concentration of photoinitiator within the build/support material. In one example, the photoinitiator may be controlled to be present in the build/support material resin at a loading of 1-5 wt %. With some materials only 1% of the light will penetrate 40 μm into such a layer. This may be an acceptable penetration depth for the UV radiation of layers having thickness greater than 40 μm. In other examples the photoinitiator loading can be increased or decreased so that the UV penetration can be controlled to correspond to the thickness of the layers being printed. Thus, while specific photoinitiator concentrations and thicknesses are mentioned herein, such are only examples, and those ordinarily skilled in the art would understand that any concentrations of photoinitiator can be used, so long as the UV exposure does not have significant inadvertent penetration to the lower layers that have been previously UV cured.

The devices and methods herein can use a single development station, or a series of development stations, one for each different color or different material. For example, multiple development stations could be used, with the only material difference of the toner being color (and all other material characteristics being the same). Alternatively, different development stations could provide different materials.

However, if a single development station is used, a continuous uniform layer of the same material is electrostatically transferred to the ITB. If multiple development stations are used, each of the stations develops and transfers a different image to the ITB electrostatically. The multiple material images are combined into a single developed layer on the ITB.

The developed layer is then heated to become tacky, and is transferred to a platen. Once the developed layer has been transferred into the platen, the platen moves to the LED curing station. The curing station selectively cures only portions of the material particles in order to create a solid part. Once the curing is performed, the platen moves to the home (initial) position to repeat the process and add the next layer. This process repeats until a solid part is created. Thus, the devices and methods herein are able to create parts or assemblies (potentially with multiple materials and/or colors). This takes advantage of fast electrostatic printing processes to create 3-D items faster.

Figure 2:
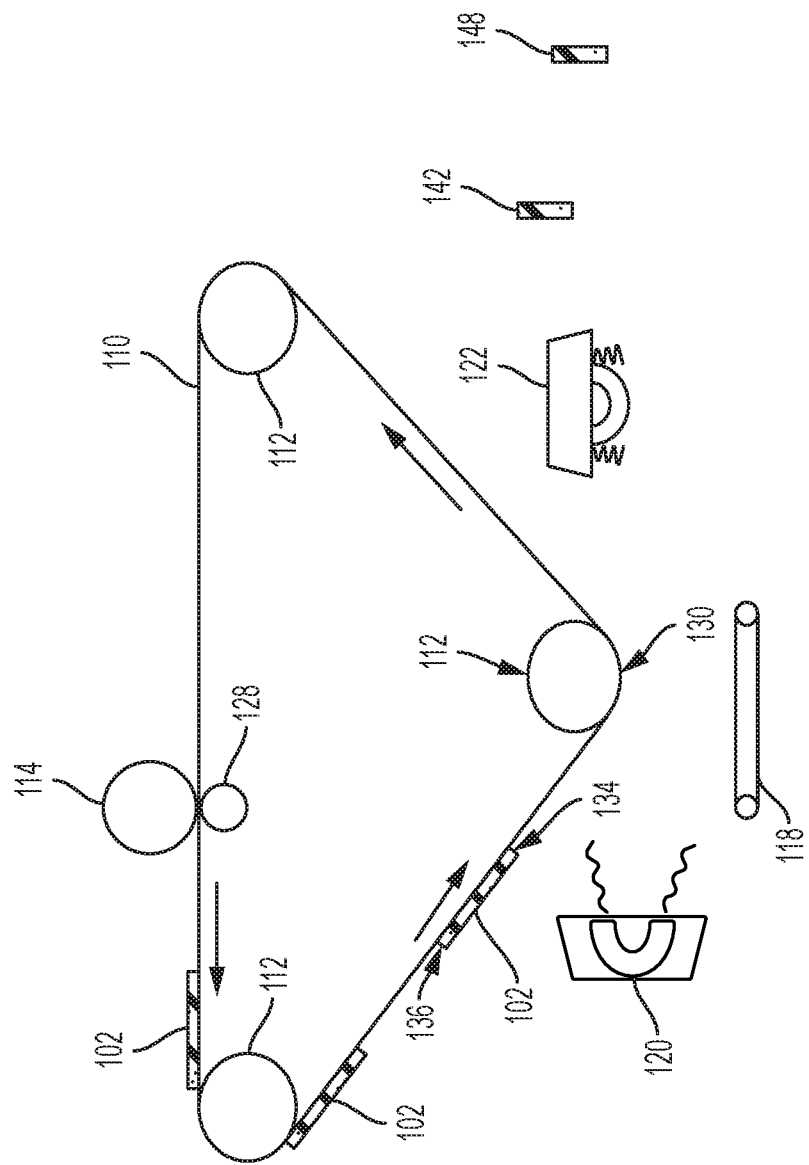
FIGS. 2-7 are schematic cross-section diagrams partially illustrating printing devices herein.
Figure 20:
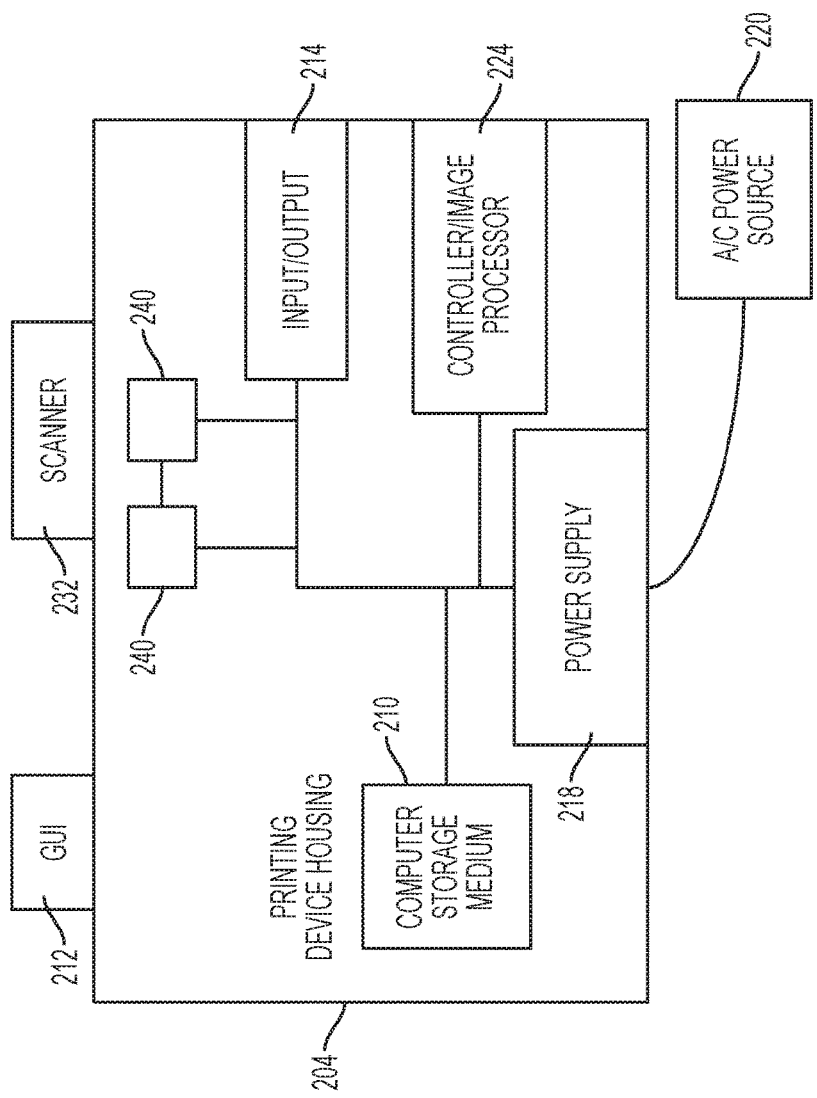
FIG. 20 is a schematic diagram illustrating a 3-D printing device herein.

As shown in FIG. 2, exemplary three-dimensional (3-D) printers herein include, among other components, an intermediate transfer surface 110, such as a drum or intermediate transfer belt (ITB) supported on rollers 112, one or more printing components (e.g., development device 114). In FIG. 2, item 118 is a platen, item 120 is a transfuse heater, item 122 is a fusing station, item 142 is a curing station (e.g., LED), and item 148 is a support material removal station. Additionally, item 130 is a transfuse nip, and items 134 and 136 denote the leading and trailing edges of each developed layer 102. Devices herein can include only one development device, as shown in FIG. 2, or can include many, as shown in FIG. 20, discussed below. Additionally, the platen 118 (which can be a surface or belt) is adjacent the ITB 110. In this example, the platen 118 is a vacuum belt.

FIG. 2 illustrates that the printing component 116 is positioned to electrostatically transfer material 102, such as a (potentially dry) powder polymer-wax material (e.g., charged 3-D toner) to the ITB 110. The electrostatic transfer occurs by way of charge difference between the belt (produced by charge generator 128, for example) and the material being transferred 102. Element 102 is sometimes referred to as a "developed layer." The developed layer 102 is on a discrete area of the ITB 110 and can be a uniform rectangle, or can be in a pattern corresponding to the components of the 3-D structure in that layer (and its associated support elements).

Figure 3:
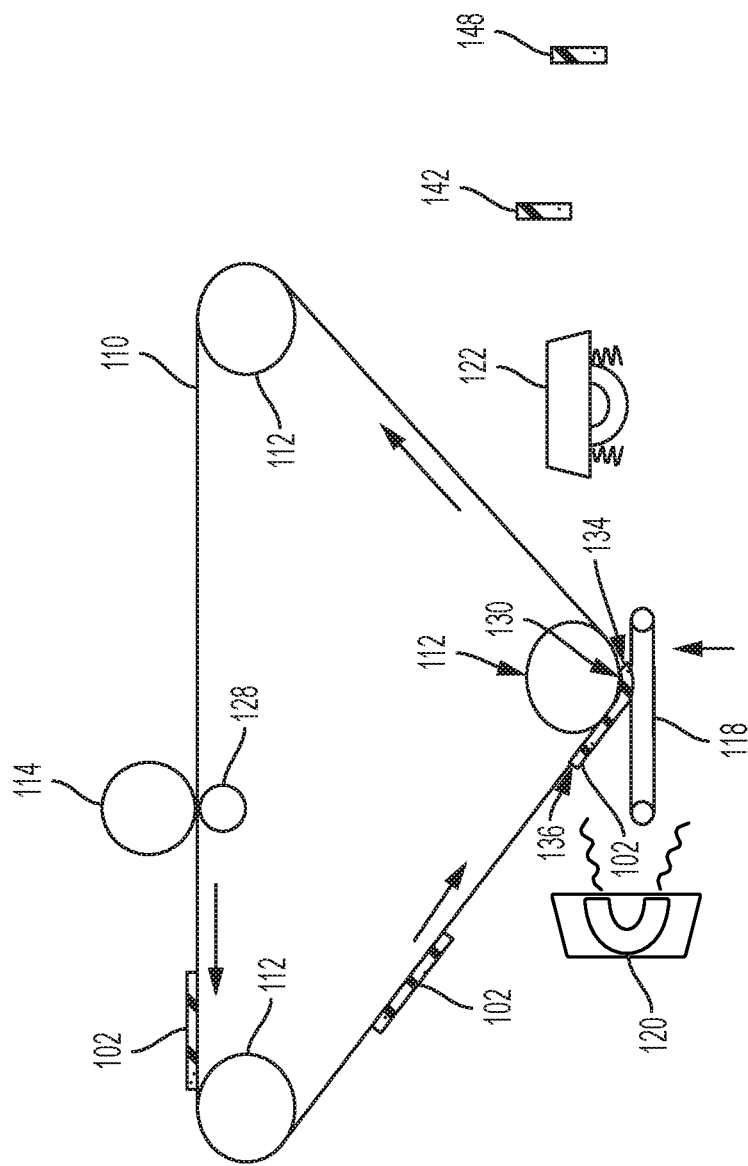

As shown in FIG. 3, the transfuse station 130 is adjacent the ITB 110. The transfuse station 130 includes a roller 112, on one side of the ITB 110, supporting the ITB 110. The transfuse station 130 is positioned to receive the layers 102 as the ITB 110 moves to the transfuse station 130. More specifically, the material development station 114 and the transfuse station 130 are positioned relative to the ITB 110 such that a layer 102 on the ITB 110, when the ITB 110 is moving in a process direction, first passes the material development station 114, and then passes the transfuse station 130.

Therefore, the material that is printed in on the ITB by development device 114 forms the developed layers 102 having a predetermined length. Again, as shown in FIG. 3, each of the developed layers 102 has a leading edge 134 oriented toward the processing direction in which the ITB 110 is moving (represented by arrows next to the ITB 110) and a trailing edge 136 opposite the leading edge 134.

As shown by the vertical arrow in FIG. 3, the platen 118 moves (using motors, gears, pulleys, cables, guides, etc. (all generally illustrated by item 118)) toward the ITB 110 to have the platen 118 make contact with the ITB 110. The developed layer 102 and ITB 110 are locally heated by heater 120 to bring the developed layer 102 to a "tacky" state prior to transfuse (i.e., to a temperature higher than the glass transition temperature (Tg) but short of the melt or fuse temperature Tm of the toner resin). The platen 118 is also heated by heater 120 to approximately the same temperature, and is then contacted synchronously with the tacky layer 102 as it translates through the ITB-platen nip (the transfuse nip 130). Thereby, the ITB 110 transfers one of the developed layers 102 of the build materials 102 and the support material 105 to the platen 118 each time the platen 118 contacts the ITB 110, to successively form developed layers 102 of the build material 102 and the support material 105 on the platen 118.

More specifically, as shown in FIG. 3, at the transfer nip 130, the leading edge 134 of the developed layer 102 within the transfer nip 130 begins to be transferred to a corresponding location of the platen 118. Thus, the platen 118 moves to contact the developed layer 102 on the ITB 110 at a location where the leading edge 134 of the developed layer 102 is at the lowest location of the roller of the transfer nip 130. In this example, the trailing edge 136 of the developed layer 102 has not yet reached the transfer nip 130 and has not, therefore, yet been transferred to the platen 118.

Figure 4:
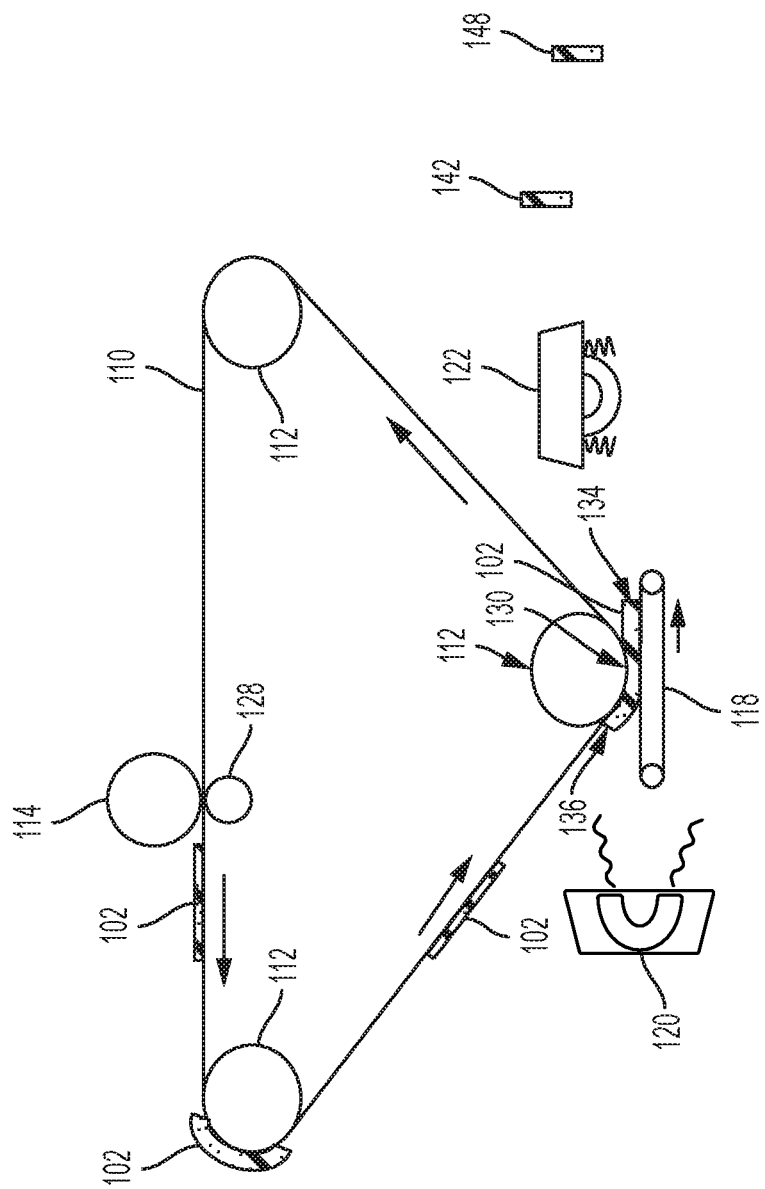

As shown in FIG. 4, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 4, the trailing edge 136 of the developed layer 102 is the only portion that has not yet reached the transfer nip 130 and has not, therefore, been transferred to the platen 118. Then, as the ITB 110 moves in the processing direction, the platen 118 moves at the same speed and in the same direction as the ITB 110, until the trailing edge 136 of the developed layer 102 reaches the bottom of the roller of the transfer nip 130, at which point the platen 118 moves away from the ITB 110 and over to the fusing station 142, as shown in FIG. 5.

Figure 5:
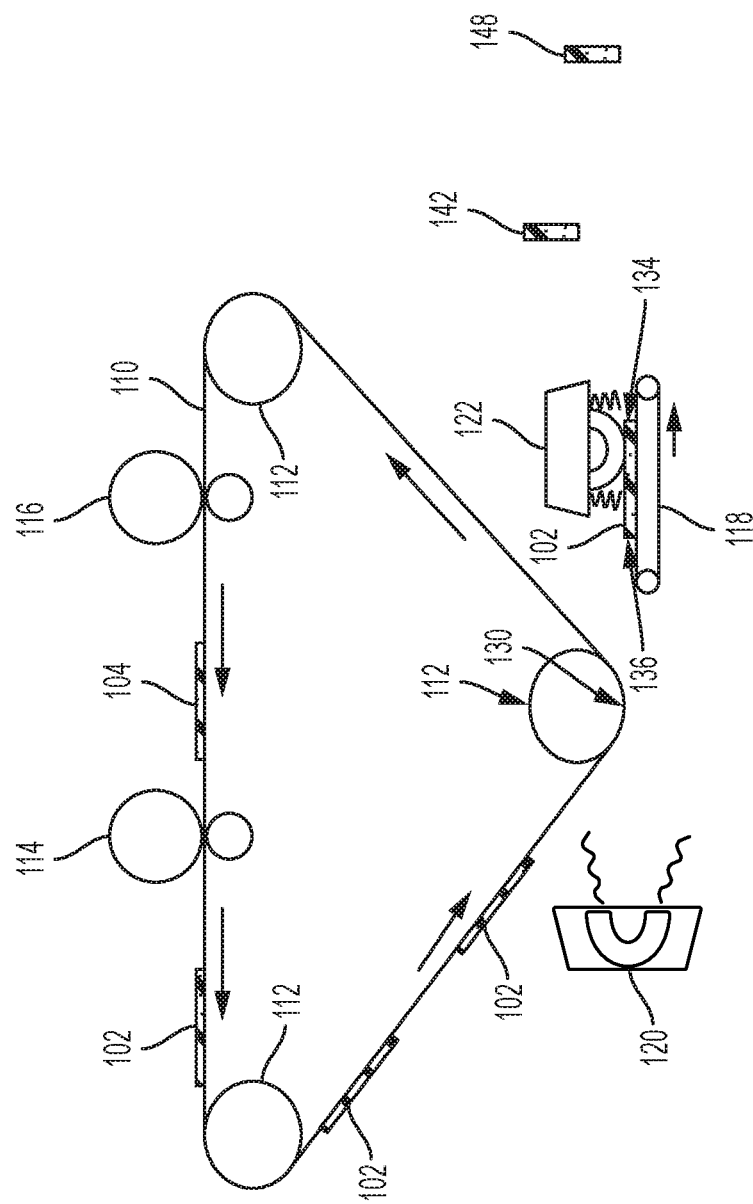
Figure 6:
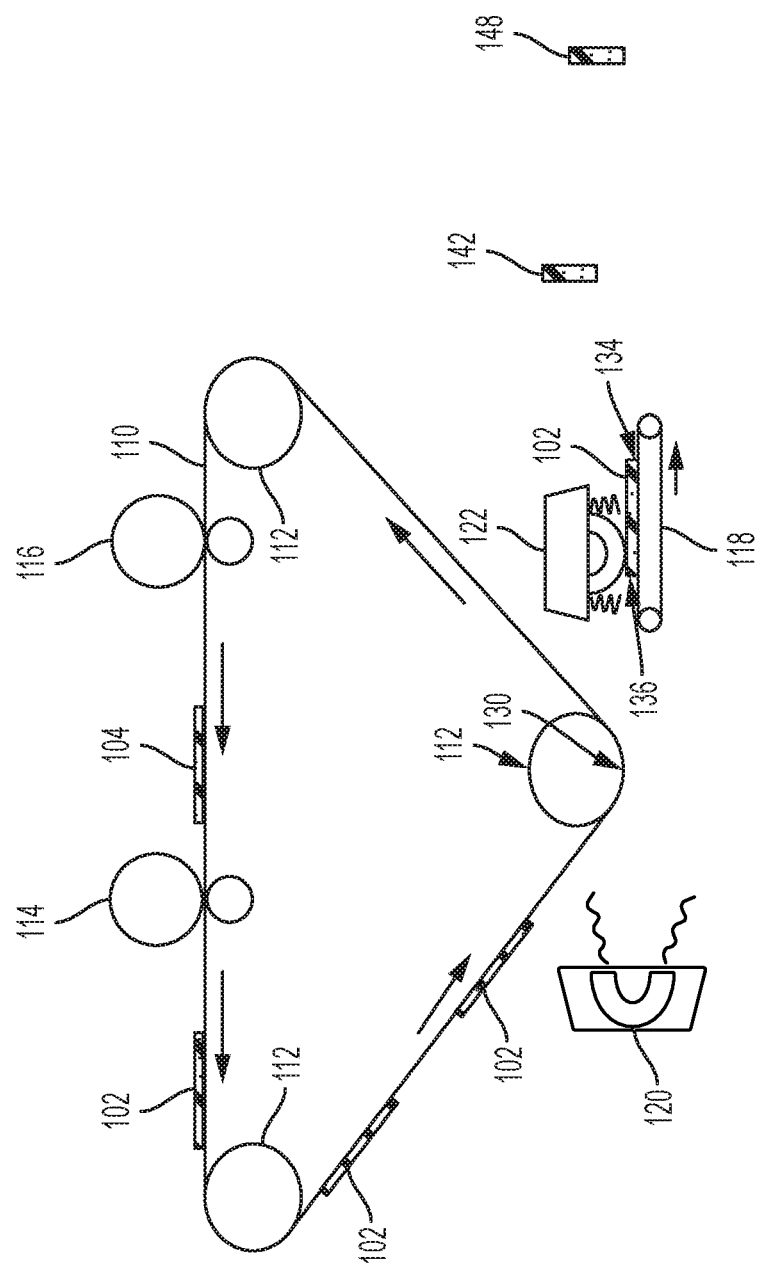

In FIG. 5, the platen 118 moves to the fusing station 122, which can include a heated pressure roller 122. As shown in FIG. 6, the platen 118 moves synchronously as the pressure roller rotates, heating and pressing the developed layer 102 to bond the developed layer 102 to the platen 118 (or to any previously transferred layers 102 existing on the platen 118). These synchronous movements between the platen 118 and the ITB 110 (and pressure roller) causes the pattern of support and build materials (102) that is printed by the development devices 114 and 116 to be transferred precisely from the ITB 110 to the platen 118, without distortion or smearing.

Figure 7:
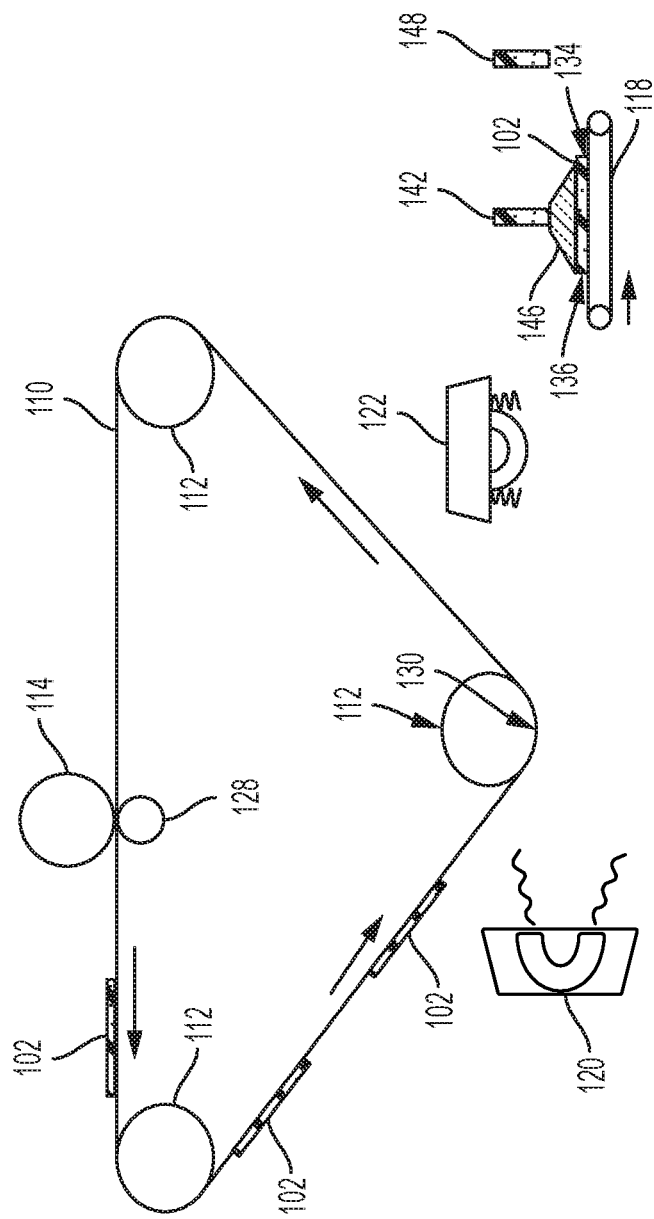

As shown in FIG. 7, the fusing station 122 is positioned between the transfuse station 130 and the curing station 142. The transfuse station 130, the fusing station 122, and the curing station 142 are positioned relative to the platen 118, such that the platen 118 first passes the transfuse station 130, then passes the fusing station 122, and then passes the curing station 142. Thus, the light emitting diode (LED) curing station 142 is positioned to selectively apply LED ultraviolet light to different portions of each layer 102 immediately after each layer is fused at the fusing station 122. The platen 118 moves to the curing station 142 after each time the ITB 110 transfers each of the developed layers 102 to the platen 118 (and after each of such layers are fused at the fusing station 122) to independently cure each of the developed layers 102 and successively join each developed layer 102 to the platen 118, to any previously transferred developed layers 102 already fused on the platen 118.

The LED curing station 142 selectively applies the LED ultraviolet light 146 to the layer 102 to crosslink polymers together in portions of the layer 102 that are to be the build material. However, the LED curing station does not apply the LED ultraviolet light to a second portion of the layer that is to be the support material. Thus, the LED ultraviolet light crosslinks polymers in the portions of build material together, without crosslinking polymers in the support material, to leave the support material as an uncrosslinked material.

Figure 8A:
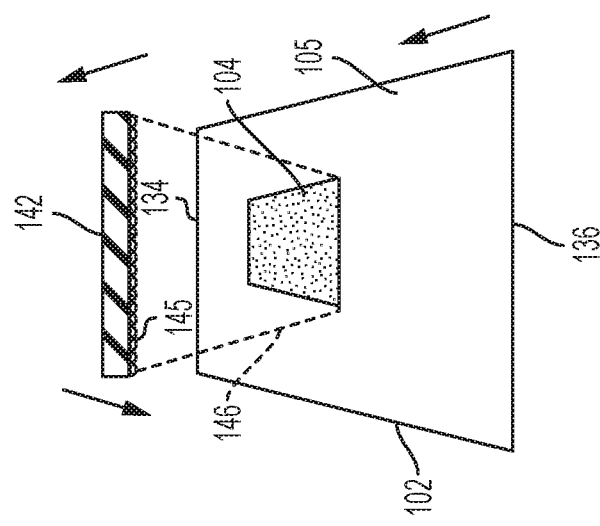
FIGS. 8A-8B are perspective schematic diagrams illustrating LED curing herein.
Figure 8B:
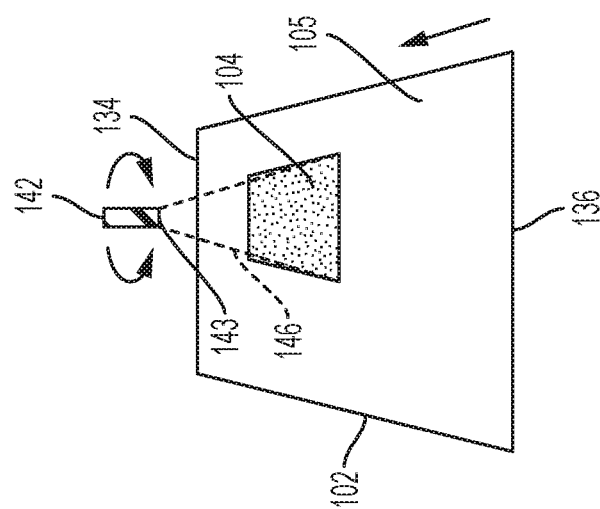

FIGS. 8A-8B illustrates one of the layers 102 being processed at the curing station 142. More specifically, in FIG. 8A, a single point source UV LED device 142 is able to directionally expose different areas of the uniform area of the layer of material 102, while in FIG. 8B, the UV LED device 142 is an array device that also selectively exposes different areas. While two configurations are illustrated, those skilled in the art would understand that item 142 is any form of LED light that provides UV wavelength light in an addressable pattern to selectively illuminate certain portions (104) of the layer 102, without illuminating other portions (105).

For example, the single point LED 142 illustrated in FIG. 8A provides a focused point of UV light (using lenses, prisms, etc. 143)), and the LED 142 includes motors, gears, etc. (all of which is schematically illustrated by item 142) to rotate (as shown by the arrows) to point the focused point of UV light at different locations on the layer 102 while the layer is stationary or moving, and thereby only provides UV radiation to selected portions of the layer 102.

In another example shown in FIG. 8B, the LED 142 is illustrated as a full-width array of multiple LEDs 145. The array 142 can be at least as wide as the layer 102, the array 142 is an elongated structure that is positioned across (e.g. parallel to) the width of the layer, and the array 142 moves in a direction perpendicular to the width of the layer 102. Thus, the array of LEDs 142 moves relatively from the leading edge to the trailing edge of the layer 102 (as shown by the arrows) while selected ones of the LEDs 145 illuminate, and by this process the array of LEDs 142 only provides UV radiation to selected portions of the layer 102. The array of LEDs 142 can move using motors and gears (all of which is schematically illustrated by item 142) or the array of LEDs 142 can be stationary and the platen 118 containing the layer 102 can pass the layer 102 by the array of LEDs 142, as each individual LED 145 in the array 142 illuminates. Those ordinarily skilled in the art would understand that FIGS. 8A and 8b illustrate but two ways in which the LED can be used to addressably provide UV radiation to selected portions (104) of the layer 102.

Therefore, in both FIGS. 8A and 8B, LED ultraviolet light 146 cures a portion of material 102 to change it to build material 104 and does not provide LED ultraviolet light 146 to other portions of the layer 102 (and these non-cured portions are sometimes referred to as the "support material 105" to distinguish such from the cured build material 104, even though the support material is the same as the material of the layer 102). Thus, the LED ultraviolet light 146 crosslinks polymers in the exposed portions of material 104, without crosslinking polymers in the unexposed support material 105 to leave the support material 105 as an uncrosslinked fused material. Again, these portions of build material 104 and support material 105 are different portions of the same fused layer 102.

Regarding the curing process, materials 102 can be cured (without being fully melted) by heating such materials 102 to a temperature between their glass transition temperature and their melting temperature, to join the materials 102 as one, without affecting their shape or pattern, thereby creating a rigid structure. Thus, with methods and devices herein, the platen moves to the curing station 142 before the layer 102 has cooled significantly, and while the layer 102 is still between the glass transition temperature and the melting temperature.

Those ordinarily skilled in the art would understand that the selection of build and support materials is coordinated with the type of curing process performed by the curing station 142. Further, other curing processing and components could be used, and that the foregoing is presented only as one limited example; and the devices and methods herein are applicable to all such methods and components, whether currently known or developed in the future. Further, in such processing the platen 118 can move to a cooling station that provides blown air (potentially cooled and dehumidified); or the platen 118 can pause to allow the layer 102 to cool before moving to the next processing step.

Figure 9:
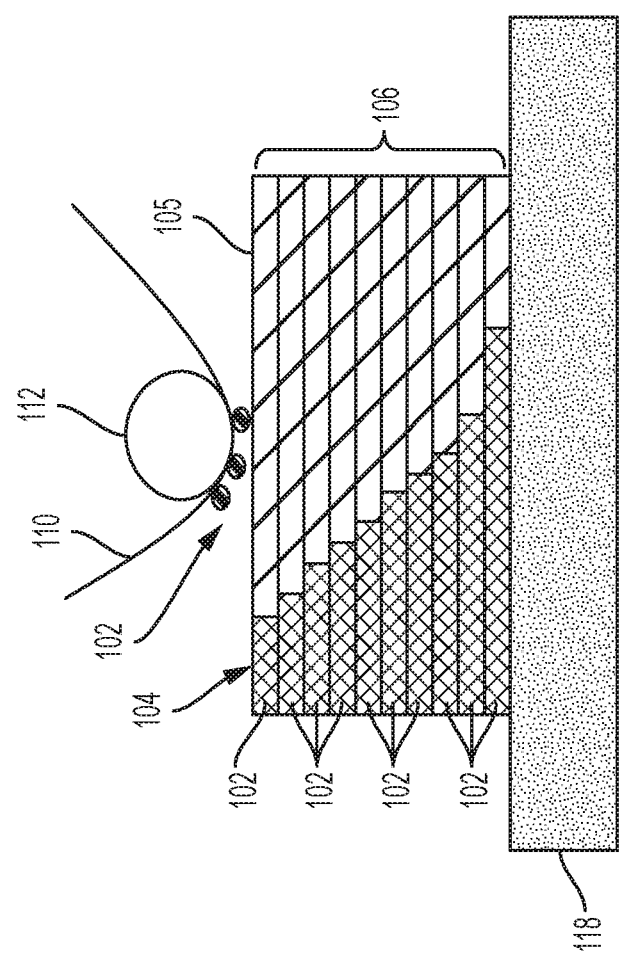
FIG. 9 is an expanded schematic diagram illustrating stacks of layers formed by devices herein.
Figure 10:
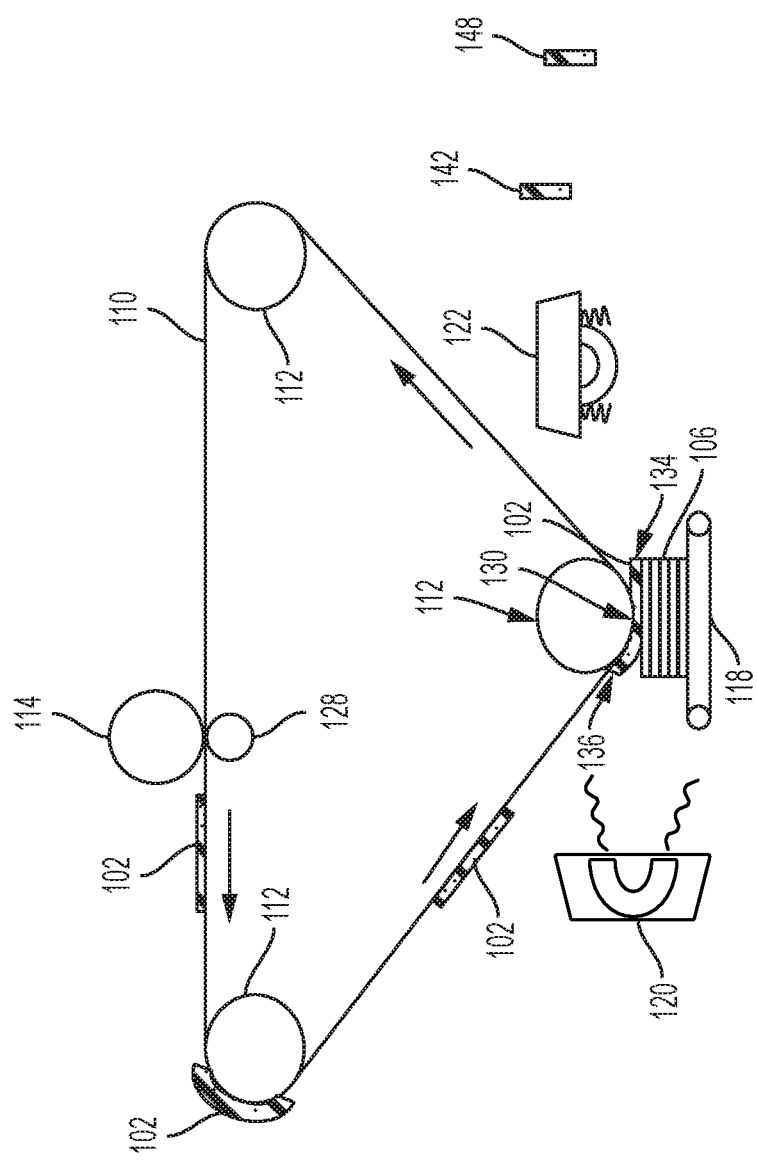
FIGS. 10-19 are schematic cross-section diagrams partially illustrating printing devices herein.
Figure 11:
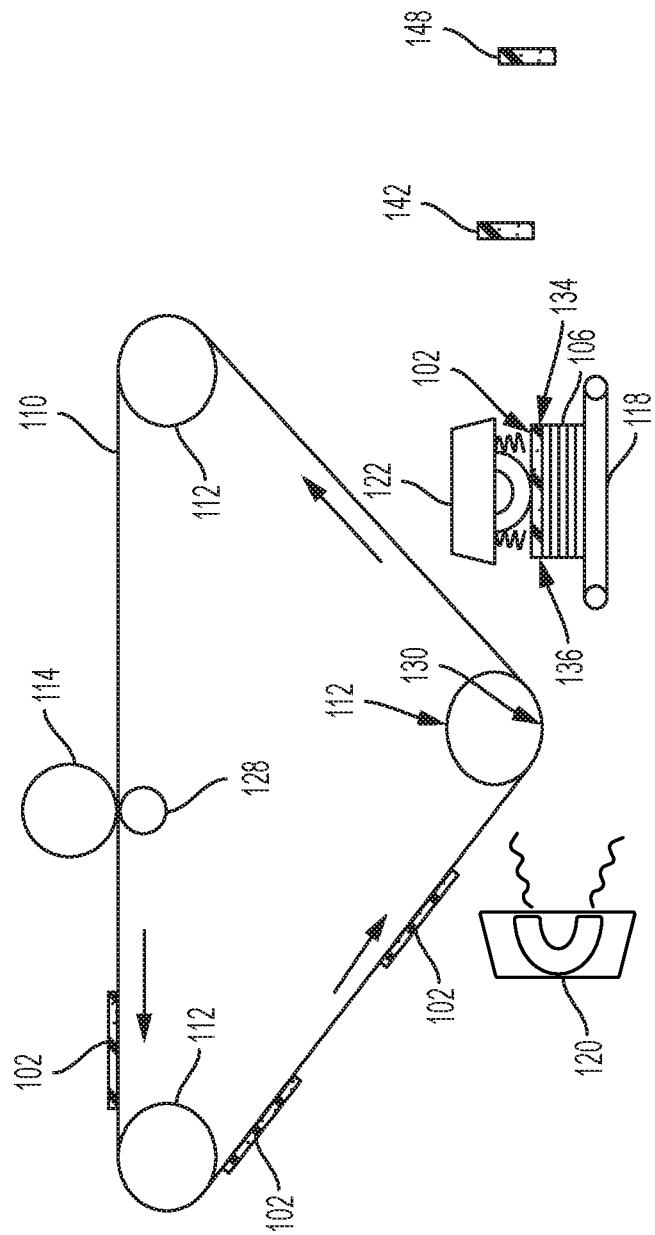
Figure 12:
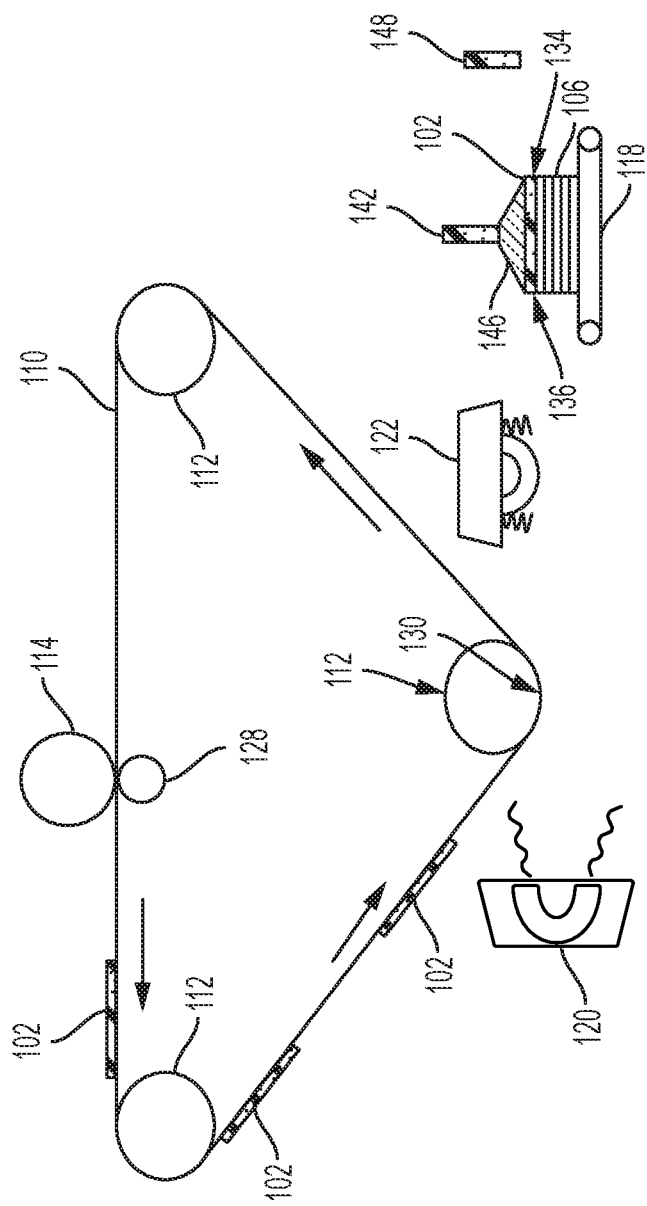

The processing in FIGS. 2-7 is repeated to crosslink polymers in multiple developed layers 102 into a stack 106, as shown in FIG. 9. The fusing station 122 fuses together the material within each of the developed layers 102, and also fuses each developed player 102 to the immediately adjacent developed layer 102 that was most recently transferred to the platen 118 (e.g., joins layers 102 that contact one another on the platen 118). As the stack 106 of the developed layers 102 grows, additional developed layers 102 are formed on top of the stack 106 (FIG. 10). As shown in FIG. 11, such additional developed layers 102 are fused together by the fusing station 122. In FIG. 12, the curing station 142 selectively cures only portions of the very top layer to crosslink polymers in only the top layer 102 of the stack 106.

Figure 13:
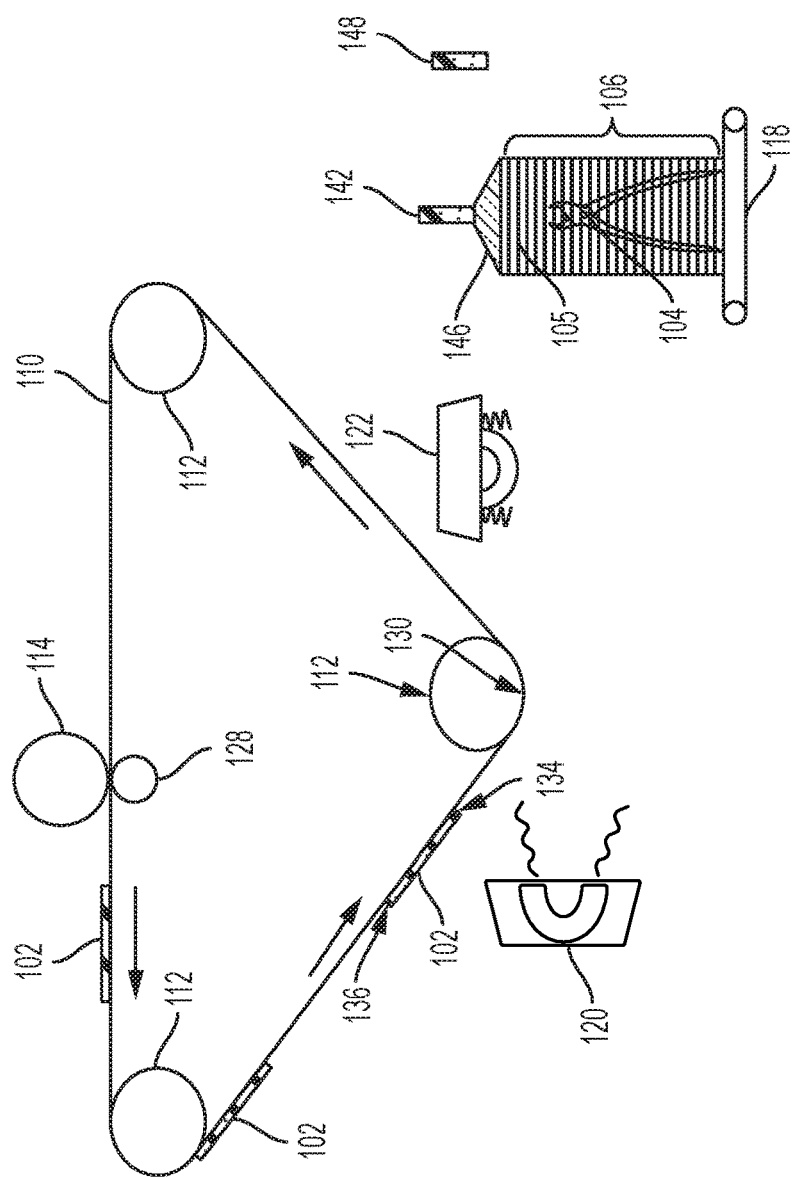

FIG. 13 shows the entire stack 106 is completely formed after all layers 102 have been transferred, fused, and cured. In addition, FIG. 13 illustrates an overlay showing portions of support material 105 and build material 104 within the accumulation of the freestanding stack 106. Such may or may not be visible, and is only illustrated to show one exemplary way in which such build and support materials may be arranged.

Figure 14:
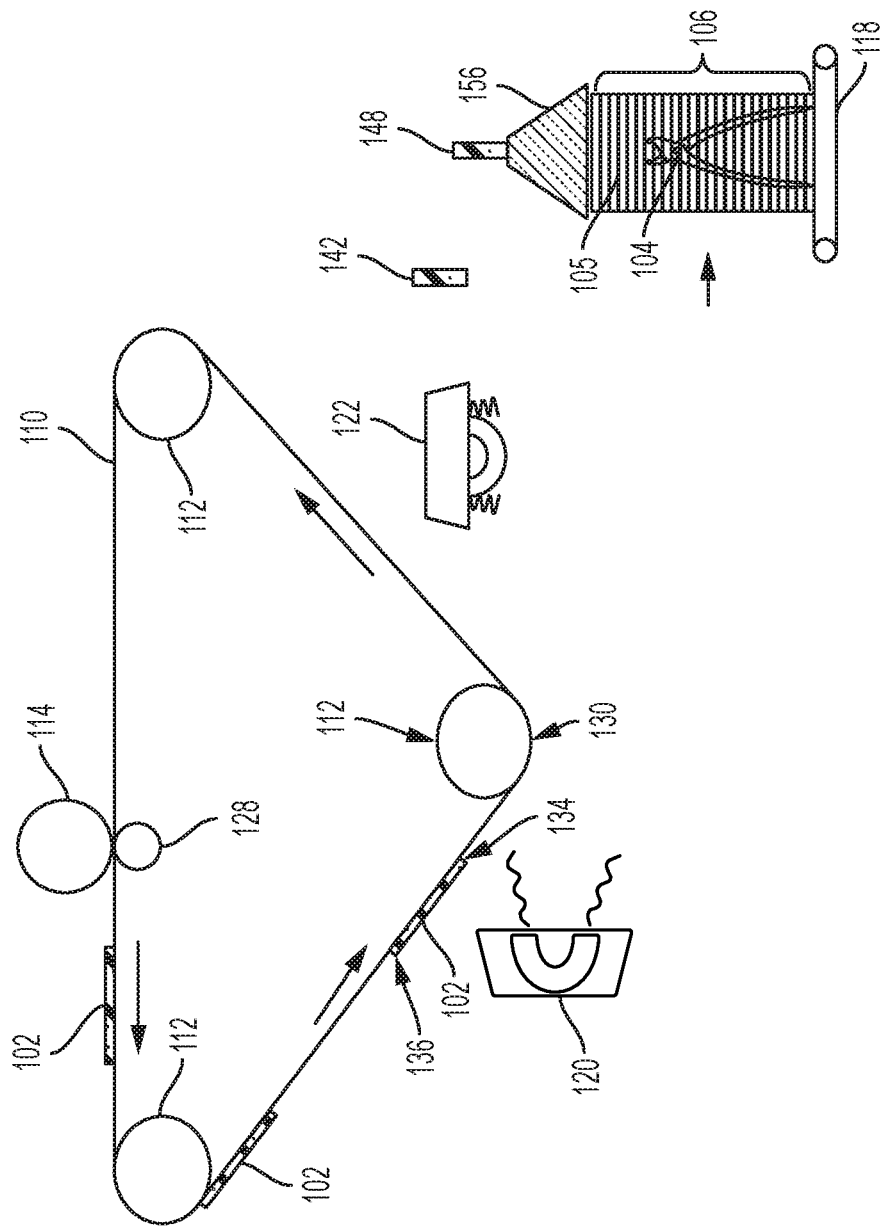
Figure 15:
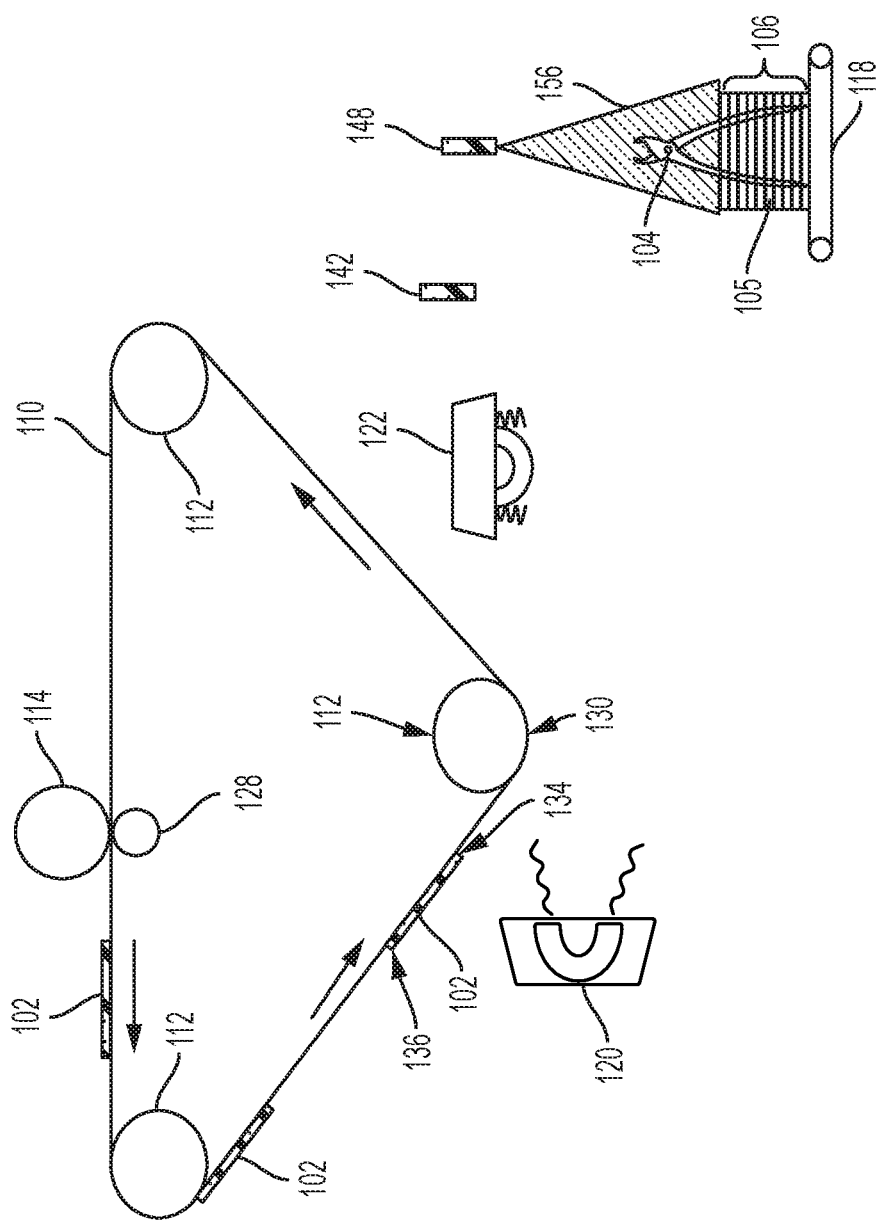
Figure 16:
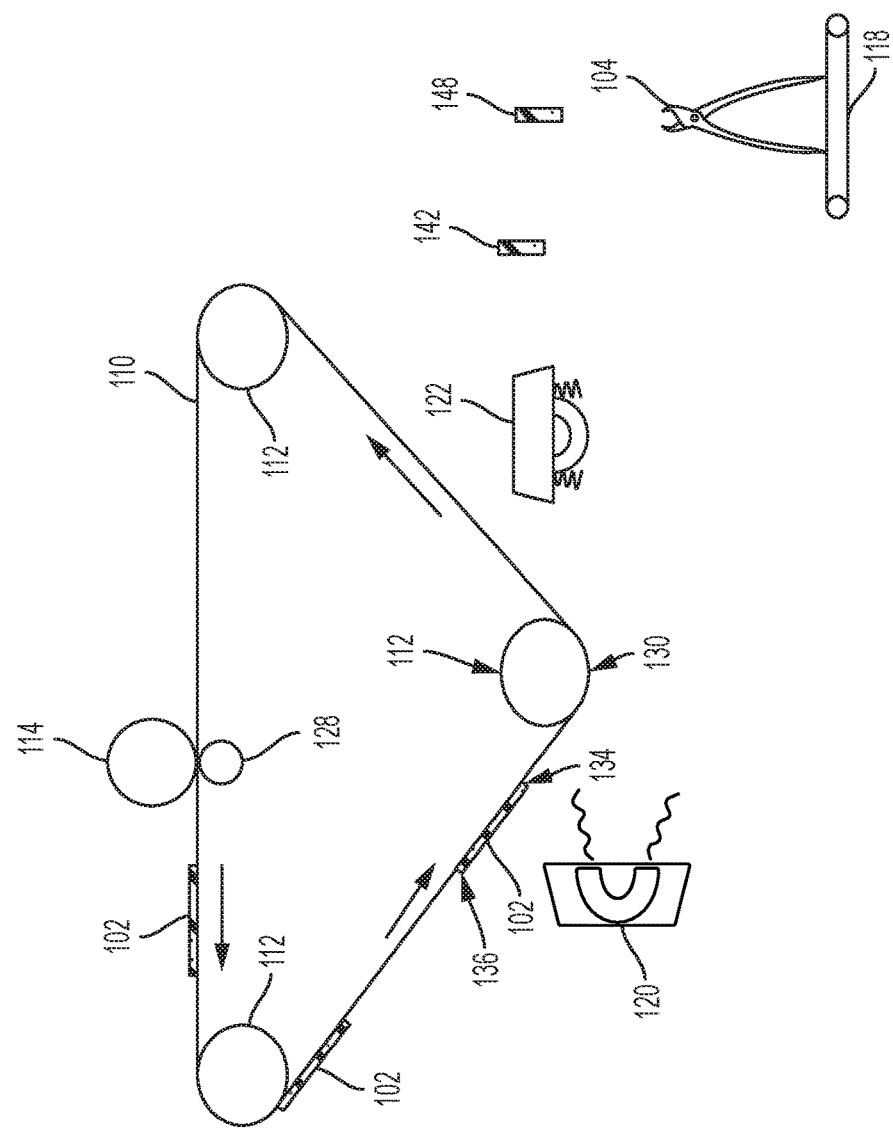

The 3-D structure of the freestanding stack 106 can be output to allow manual removal of the support material 105 using an external solvent bath, etc; or automated processing can proceed as shown in FIG. 14-16. More specifically, as shown in FIG. 14, the support material removal station 148 is positioned to receive the now cured 3-D freestanding stack 106 on the platen 118. The support material removal station 148 applies a solvent, water, etc., 156. Any solvent 156 applied by the support material removal station 148 is selected to dissolve the support material 105 without affecting the build material 104. Again, as noted above, the solvent utilized will depend upon the chemical makeup of the build material 104 and the support material 105. FIG. 15 illustrates the processing where about half of the support material 105 remains, and a portion of the build material 104 protrudes from the remaining stack of support material 105. FIG. 16 illustrates processing after the support material removal station 148 has dissolved or removed all the support material 105, leaving only the build material 104 remaining, which leave a completed 3-D structure made of only the build material 104.

Figure 17:
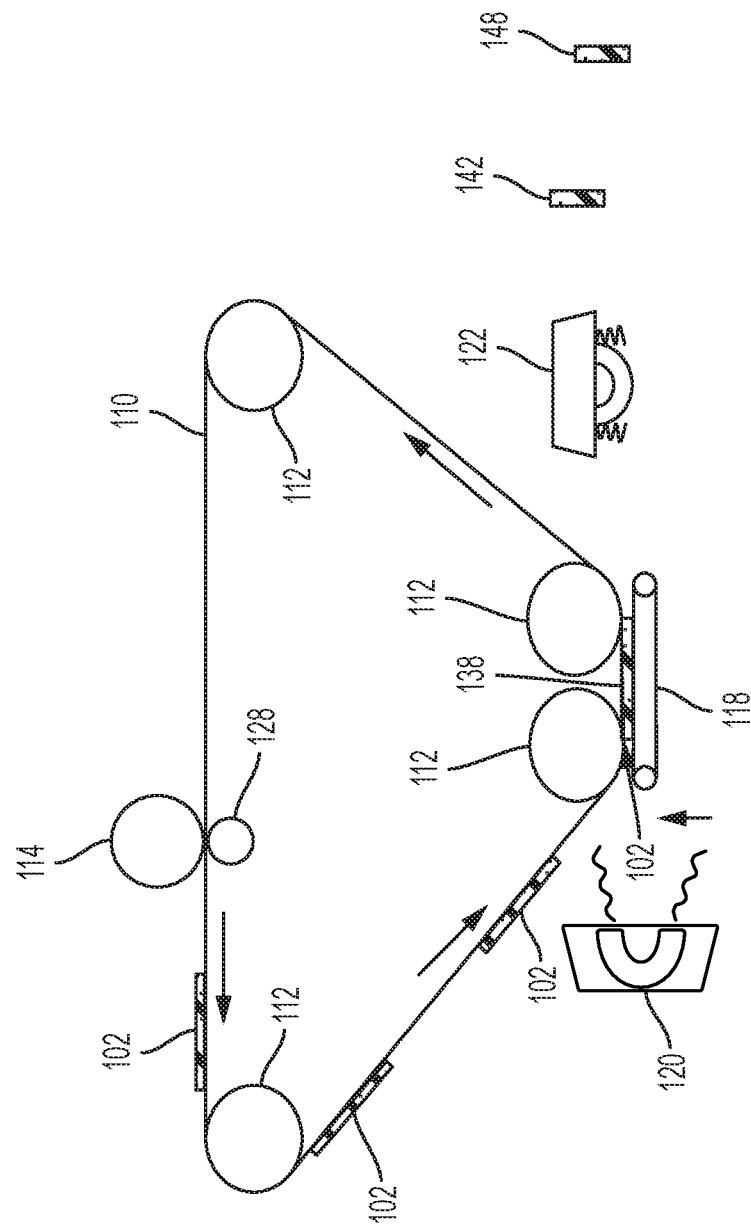
Figure 18:
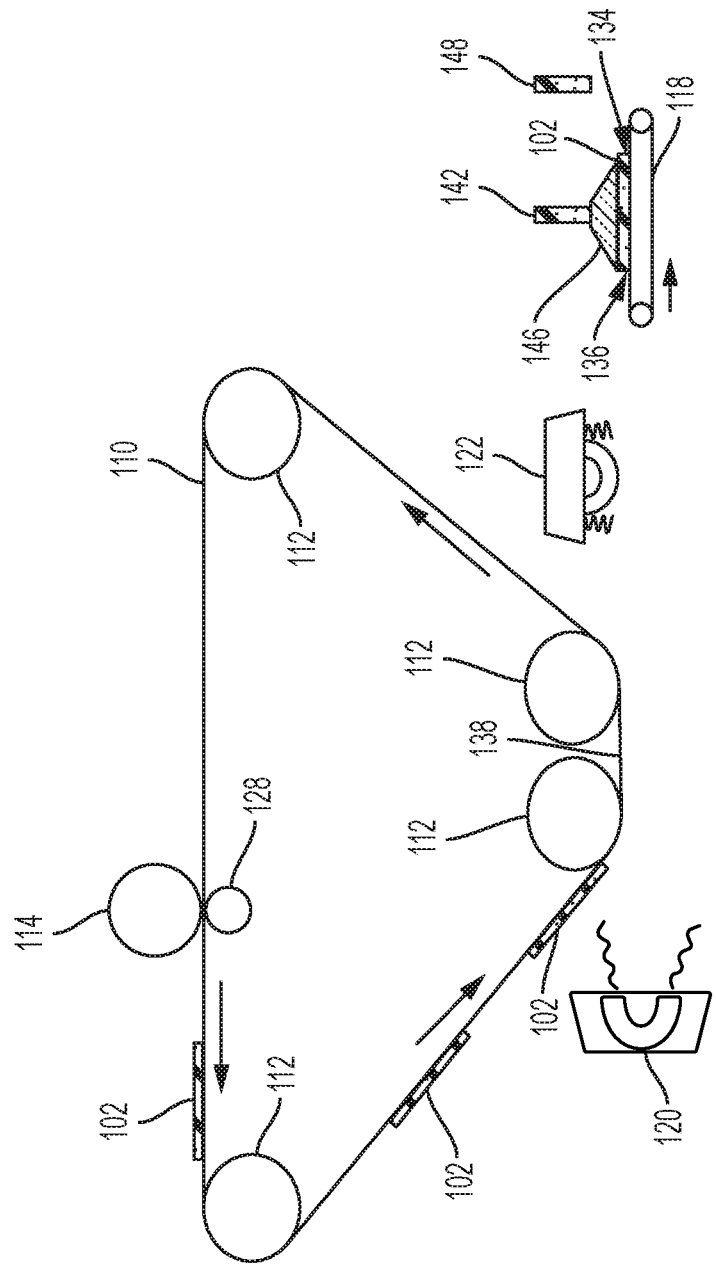
Figure 19:
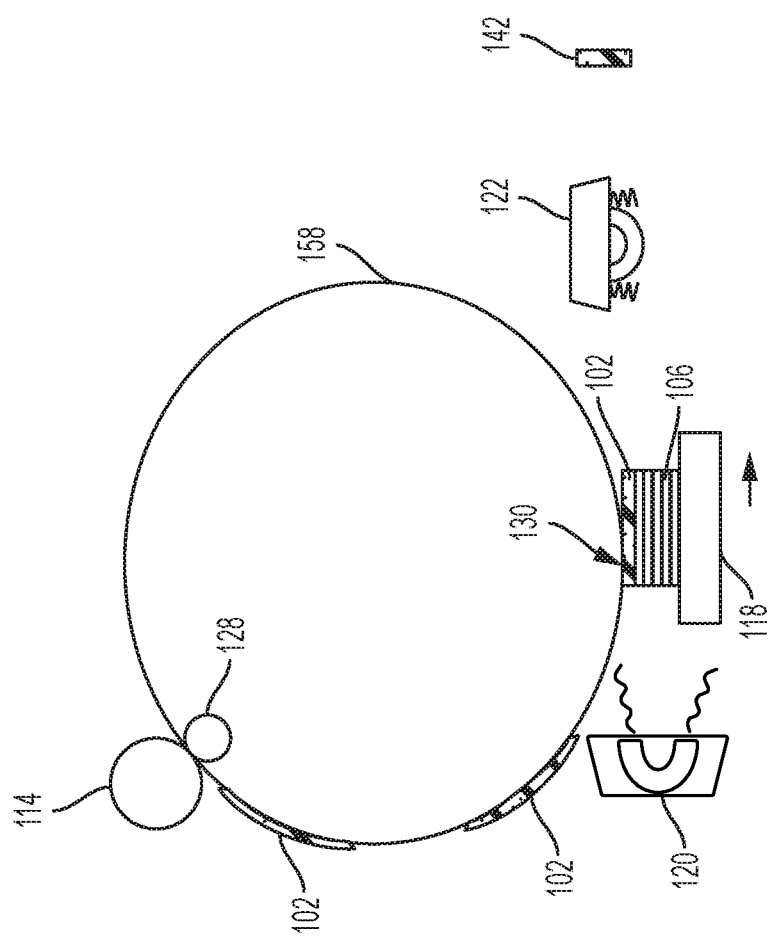

FIGS. 17 and 18 illustrate an alternative 3-D electrostatic printing structure herein which includes a planar transfuse station 138 in place of the transfer nip 130 shown in FIG. 1. As shown in FIG. 17, the planar transfuse station 138 is a planar portion of the ITB 110 that is between rollers 112 and is parallel to the platen 118. As shown in FIG. 18, with this structure, when the platen 118 moves to contact the planar transfuse station 138, all of the developed layer 102 is transferred simultaneously to the platen 118 or partially formed stack 106, avoiding the rolling transfer process shown in FIGS. 3 and 4. Alternatively, as shown in FIG. 19, a drum 158 could be used in place of the ITB 110, with all other components operating as described herein. Thus, the drum 158 could be an intermediate transfer surface receiving material from development station 114, as described above, or could be a photoreceptor and operate as the photoreceptor 256 described below operates, by maintaining a latent image of charge and receiving materials from development devices 254.

FIG. 20 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphic user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 20, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 21:
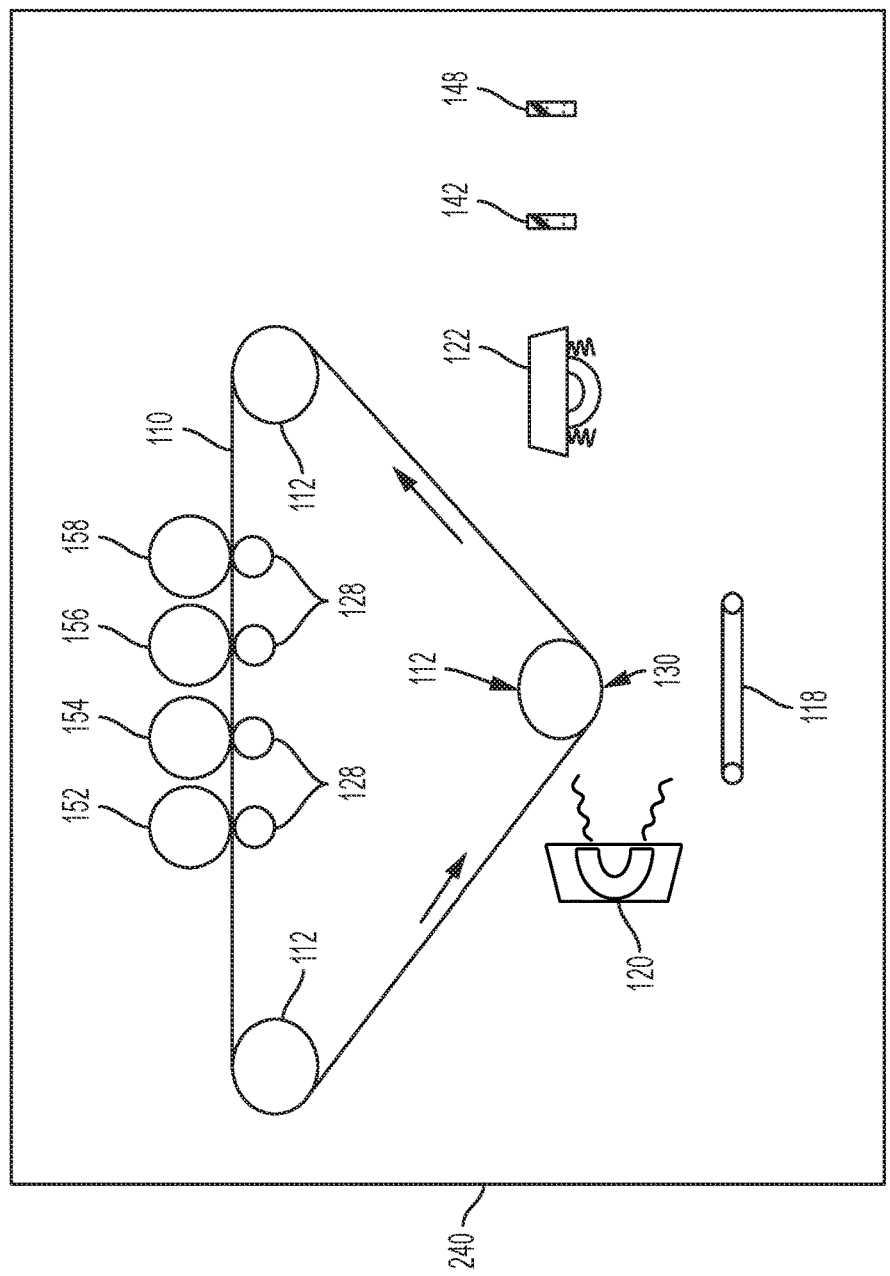
FIG. 21 is a schematic diagram illustrating a printing engine herein.

The one or more printing engines 240 are intended to illustrate any marking device that applies build and support materials (toner, etc.) whether currently known or developed in the future and can include, for example, devices that use an intermediate transfer belt 110 (as shown in FIG. 21).

Thus, as shown in FIG. 21, each of the printing engine(s) 240 shown in FIG. 20 can utilize one or more potentially different (e.g., different color, different material, etc.) build material development stations 152-158, one or more potentially different (e.g., different color, different material, etc.) support material development stations, etc. The development stations 152-158 can be any form of development station, whether currently known or developed in the future, such as individual electrostatic marking stations, individual inkjet stations, individual dry ink stations, etc. Each of the development stations 152-158 transfers a pattern of material to the same location of the intermediate transfer belt 110 in sequence during a single belt rotation (potentially independently of a condition of the intermediate transfer belt 110) thereby, reducing the number of passes the intermediate transfer belt 110 should make before a full and complete image is transferred to the intermediate transfer belt 110.

Thus, FIG. 21 illustrates different color development stations 152-158 positioned to electrostatically transfer different color materials to an intermediate transfer belt (ITB 110); for example, each different development station 152-158 can provide a color of material that is different from the colors of the materials supplied by other development stations 152-158. While FIG. 21 illustrates four development stations adjacent or in contact with a rotating belt (110), as would be understood by those ordinarily skilled in the art, such devices could use any number of marking stations (e.g., 1, 2, 3, 5, 8, 11, etc.).

One exemplary individual electrostatic development station 114 is shown in FIG. 22 positioned adjacent to (or potentially in contact with) intermediate transfer belt 110. Each of the individual electrostatic development stations 114 includes its own charging station 258 that creates a uniform charge on an internal photoreceptor 256, an internal exposure device 260 that patterns the uniform charge into a latent image of charge, and an internal development device 254 that transfers build or support material to the photoreceptor 256 in a pattern matching the charge latent image. The pattern of build or support material is then drawn from the photoreceptor 256 to the intermediate transfer belt 110 by way of an opposite charge of the intermediate transfer belt 110 relative to the charge of the build or support material, that is usually created by a charge generator 128 on the opposite side of the intermediate transfer belt 110.

UV curable toner contains a resin with ethylenic unsaturation (double bonds) in the resin backbone structure, an optional crosslinking agent which bonds adjacent polymer strands together and a UV photoinitiator. Sometimes, the crosslinking agent is omitted as the polymer backbone of the toner resin contains ethylenic unsaturation can achieve the desired crosslinking with adjacent polymer backbones. Notwithstanding this, various high temperature stable crosslinking agents can also be incorporated into the material toner resin 102, if desired As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV ultraviolet light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV ultraviolet light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
an intermediate transfer surface;
a development station positioned to electrostatically transfer layers of material comprising a dry polymer powder to said intermediate transfer surface;
a transfuse station adjacent said intermediate transfer surface;
a platen moving relative to said intermediate transfer surface, said intermediate transfer surface transfers a layer of said material to said platen each time said platen contacts one of said layers on said intermediate transfer surface at said transfuse station to successively form a freestanding stack of said layers on said platen; and
a curing station positioned to apply ultraviolet light to said layer after said layer is transferred from said transfuse station to said platen, said curing station selectively applies said ultraviolet light to crosslink polymers in only a portion of said material within said layer, and said curing station contains components that provide said ultraviolet light to a penetration depth limited to said layer, and avoid providing said ultraviolet light to said freestanding stack on which said layer is positioned.

2. The 3-D printer according to claim 1, said curing station does not apply said ultraviolet light to a second portion of said material within said layer, and said ultraviolet light crosslinks polymers in said portion together, without crosslinking polymers in said second portion, to leave said second portion as an uncrosslinked material.

3. The 3-D printer according to claim 1, said curing station does not apply said ultraviolet light to a second portion of said material within said layer, said portion is less than all of said layer, and said portion and said second portion are different portions of said layer.

4. The 3-D printer according to claim 1, said curing station does not apply said ultraviolet light to a second portion of said material within said layer, and
said 3-D printer further comprises a material removal station positioned to remove said second portion to separate said portion from said second portion, and leave a 3-D printed part.

5. The 3-D printer according to claim 4, said material removal station comprises a solvent rinsing device.

6. The 3-D printer according to claim 1, further comprising a fusing station positioned between said transfuse station and said curing station.

7. The 3-D printer according to claim 6, said transfuse station, said fusing station, and said curing station are positioned such that said platen first passes said transfuse station, then passes said fusing station, and then passes said curing station.

8. A three-dimensional (3-D) printer comprising:
an intermediate transfer surface;
development stations positioned to electrostatically transfer layers of different materials comprising a dry polymer powder to said intermediate transfer surface;
a transfuse station adjacent said intermediate transfer surface, said transfuse station is positioned to receive said layers as said intermediate transfer surface moves past said transfuse station;
a platen moving relative to said intermediate transfer surface, said intermediate transfer surface transfers a layer of said different materials to said platen each time said platen contacts one of said layers on said intermediate transfer surface at said transfuse station to successively form a freestanding stack of said layers on said platen; and
an LED curing station positioned to apply LED ultraviolet light to each said layer after said layer is transferred from said transfuse station to said platen, said LED curing station selectively applies said LED ultraviolet light to crosslink polymers in only a portion of said different materials within said layer, and said LED curing station contains components that provide said LED ultraviolet light to a penetration depth limited to said layer and avoid providing said ultraviolet light to said freestanding stack on which said layer is positioned.

9. The 3-D printer according to claim 8, said LED curing station does not apply said LED ultraviolet light to a second portion of said material within said layer, and said LED ultraviolet light crosslinks polymers in said portion together, without crosslinking polymers in said second portion, to leave said second portion as an uncrosslinked material.

10. The 3-D printer according to claim 8, said LED curing station does not apply said LED ultraviolet light to a second portion of said material within said layer, said portion is less than all of said layer, and said portion and said second portion are different portions of said layer.

11. The 3-D printer according to claim 8, said LED curing station does not apply said LED ultraviolet light to a second portion of said material within said layer, and
said 3-D printer further comprises a material removal station positioned to remove said second portion to separate said portion from said second portion, and leave a 3-D printed part.

12. The 3-D printer according to claim 11, said material removal station comprises a solvent rinsing device.

13. The 3-D printer according to claim 8, further comprising a fusing station positioned between said transfuse station and said LED curing station.

14. The 3-D printer according to claim 13, said transfuse station, said fusing station, and said LED curing station are positioned such that said platen first passes said transfuse station, then passes said fusing station, and then passes said LED curing station.

15. A three-dimensional (3-D) printer comprising:
an intermediate transfer surface;
development stations positioned to electrostatically transfer layers of different materials comprising a dry polymer powder to said intermediate transfer surface;
a transfuse station adjacent said intermediate transfer surface, said transfuse station is positioned to receive said layers as said intermediate transfer surface moves past said transfuse station;
a platen moving relative to said intermediate transfer surface, said intermediate transfer surface transfers a layer of said different materials to said platen each time said platen contacts one of said layers on said intermediate transfer surface at said transfuse station to successively form a freestanding stack of said layers on said platen; and
a heater adjacent said transfuse station, said heater contains components that provide heat at a temperature above a glass transition temperature of said different materials and below a melting point of said different materials; and
an LED curing station positioned to apply LED ultraviolet light to each said layer after said layer is transferred from said transfuse station to said platen and while said different materials are heated to said temperature by said heater, said LED curing station selectively applies said LED ultraviolet light to said layer to crosslink polymers together only in portions of said different materials within said layer, said LED curing station contains components that provide said LED ultraviolet light to a penetration depth limited to said layer and avoid providing said ultraviolet light to said freestanding stack on which said layer is positioned, and said temperature provides sufficient mobility to said different materials to allow individual polymer backbone chains in said different materials to physically approach each other in response to said ultraviolet light being selectively applied.

16. The 3-D printer according to claim 15, said LED curing station does not apply said LED ultraviolet light to a second portion of said material within said layer, and said LED ultraviolet light crosslinks polymers in said portion together, without crosslinking polymers in said second portion, to leave said second portion as an uncrosslinked material.

17. The 3-D printer according to claim 15, said LED curing station does not apply said LED ultraviolet light to a second portion of said material within said layer, said portion is less than all of said layer, and said portion and said second portion are different portions of said layer.

18. The 3-D printer according to claim 15, said LED curing station does not apply said LED ultraviolet light to a second portion of said material within said layer, and
said 3-D printer further comprises a material removal station positioned to remove said second portion to separate said portion from said second portion, and leave a 3-D printed part.

19. The 3-D printer according to claim 18, said material removal station comprises a solvent rinsing device.

20. The 3-D printer according to claim 15, further comprising a fusing station positioned between said transfuse station and said LED curing station, said transfuse station, said fusing station, and said LED curing station are positioned such that said platen first passes said transfuse station, then passes said fusing station, and then passes said LED curing station.

* * * * *